United States Patent
Alvidrez

(10) Patent No.: US 6,540,859 B1
(45) Date of Patent: Apr. 1, 2003

(54) METHOD FOR SPLICING HOSE

(75) Inventor: Alfred Alvidrez, El Cajon, CA (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 09/978,319

(22) Filed: Oct. 16, 2001

(51) Int. Cl.$^7$ .......................... C09J 5/10; B65H 69/06; B65H 69/08
(52) U.S. Cl. ...................... 156/158; 156/280; 156/289; 156/294; 156/308.2
(58) Field of Search .................. 156/94, 155, 157–158, 156/278–280, 289, 296, 294, 159, 304.2, 308.2; 285/260.2, 288.18

(56) References Cited

U.S. PATENT DOCUMENTS

| | | | |
|---|---|---|---|
| 4,636,272 A | 1/1987 | Riggs | 156/158 |
| 5,690,769 A | 11/1997 | Daigle et al. | 156/158 |
| 6,090,233 A | 7/2000 | Delmer | 156/94 |

Primary Examiner—Richard Crispino
Assistant Examiner—Sing P. Chan
(74) Attorney, Agent, or Firm—IPLM Group, P.A.

(57) ABSTRACT

A method for splicing hose comprises applying a non-toxic anti-bonding agent (117) to an inside surface (102) of a first end (104) of a first hose segment (101). The first end (104) of the first hose segment (104) is then inserted into a second end (101) of a second hose segment (107) so that the first hose segment end (104) is completely circumscribed by the second hose segment end (110). This creates an overlapping portion (113) of the two hose segment ends (104) and (110). A structural integrity material (120) is applied to the overlapping portion (113) proximate the first end (104), and then the first hose segment end (104) and the second hose segment end (110) are then fused together to create a hose splice (100).

19 Claims, 2 Drawing Sheets

METHOD FOR SPLICING HOSE

BACKGROUND OF THE INVENTION

1. Field of the Invention

The present invention relates to a method for splicing hose using a non-toxic anti-bonding agent.

2. Description of the Prior Art

Agricultural irrigation utilizes irrigation hose known as "drip tape" to irrigate crops by distributing water substantially uniformly at discreet locations spaced along the length of the drip tape. Because drip tapes are relatively flat hoses, they are more easily rolled, transported, and stored than hoses that remain round in cross section. Drip tapes have become increasingly utilized in row-crop farming because water is distributed to the soil immediately adjacent to the growing plants and the entire field need not be irrigated. Sprinklers do the initial watering around the seedlings and then the drip tape is stretched out and placed on the ground to water the crops.

A problem that hinders the further use of drip-tapes for irrigation of major crops is the cost of replacing or repairing the drip tapes. Over time, the repeated installation and retrieval of used drip tapes results in an increasing number of unjoined segments of tape. Typically, there are many unjoined segments on the retrieved drip tape spool, even after only one use, because the drip tape segments are only as long as the particular row from which they are retrieved. Since the row lengths generally vary, the used drip tape segment upon reinstallation will most probably require a coupling because the used segment will likely be too long or too short for the new row length. This problem is compounded with each additional retrieval and reinstallation. Eventually, the high cost of the couplings and installation labor make the further use of the used drip tapes economically not feasible. Also, discarding the drip tapes is environmentally unfriendly.

On most farms, the drip tapes are used once and then discarded, however, discarding the drip tapes is wasteful and disposal costs are significant, but in most situations there has been no feasible alternative. Vegetable growers have developed a way to reclaim and reuse drip tape, and the drip tape can be reused up to fifteen times before it is discarded. This reclaiming process involves pulling the short lengths (approximately 500 feet) of drip tape out of the field, splicing them together, and reeling the spliced drip tape onto plastic reels holding 5,000 feet of drip tape or more. An example of this is U.S. Pat. No. 6,090,233 discussed hereafter.

Conventional repair methods for flexible hoses incorporate the use of injection molded plastic couplings to splice together unjoined pieces of flexible hoses. Examples of such couplings include those sold by Agricultural Products Inc. under the name TAPELOC FITTINGS™. However, in addition to the cost of these couplings, the couplings must be removed each time the hose is retrieved because the coupling is rigid and can damage the hose as the hose coils on the take-up spool. Removing the plastic couplings and reinstalling them each time the hose is reused is both time consuming and expensive thereby limiting the feasibility of reusing the hose. In addition, the coupler has a diameter smaller than the diameter of the hose and can have a flow reducing effect on the hose.

U.S. Pat. No. 4,636,272 by Riggs discloses a process for thermally bonding plastic tubes utilizing a stepped mandrel. This process, however, is not conducive to bonding irrigation hoses because only relatively short segments of tubing may be bonded together since the mandrel is of limited length.

U.S. Pat. No. 6,090,233 by Delmer discloses an irrigation hose splice and a method of making an irrigation hose splice. A flat heat shield is inserted into a first hose segment to prevent its inner circumferential surface from fusing together when the first hose segment is later fused to a second hose segment. The first hose segment is inserted into a second hose segment 107 creating an area where the two segments overlap. Heat and compression are simultaneously applied to the overlapping area to fuse the segments together creating an irrigation hose splice composed of material from the first hose segment and the second hose segment 107 fused together. The flat heat shield prevents the inside surface of the first hose segment from also fusing together and blocking the waterway of the hoses, and the flat heat shield is later removed from the spliced hose.

The present method addresses these problems and provides a relatively simple, economical way to repair irrigation hoses.

SUMMARY OF THE INVENTION

In a preferred embodiment method for splicing hose, a non-toxic anti-bonding agent is applied to an inside surface of a first end of a first hose. The first end of the first hose is inserted into a second end of a second hose thereby creating an overlapping portion where the first hose is inserted into the second hose. Heat and pressure are applied to the overlapping portion thereby bonding the first hose and the second hose together to form a spliced hose, wherein the anti-bonding agent prevents the inside surface of the first end from fixedly fusing together.

In a preferred embodiment method for splicing hose, a non-toxic anti-bonding agent is applied to an inside surface of a first end of a first hose. The first end of the first hose is inserted into a second end of a second hose thereby creating an overlapping portion where the first hose is inserted into the second hose. Heat and pressure are applied to the overlapping portion thereby bonding the first hose and the second hose together to form a spliced hose, wherein the anti-bonding agent prevents the inside surface of the first end from fixedly fusing together. Then, water is allowed to flow through the spliced hose to peel apart the inside surface thereby opening the spliced hose.

In a preferred embodiment method for splicing hose, a non-toxic anti-bonding agent is applied to an inside surface of a first end of a first hose. The first end of the first hose is inserted into a second end of a second hose thereby creating an overlapping portion where the first hose and the second hose overlap. The first hose and the second hose are bonded together, wherein the anti-bonding agent prevents the inside surface of the first end from fixedly fusing together.

In a preferred embodiment method for repairing a hose, a first hose having a first open end, a first inside surface, and a first outside surface is provided. A non-toxic anti-bonding agent is applied to the inside surface of the first hose. A second hose having a second open end and a second inside surface is provided. The first end of the first hose is inserted into the second end of the second hose thereby creating an overlapping portion, wherein the first outside surface contacts the second inside surface. The first hose and the second hose are bonded together proximate the overlapping portion to create a single repaired hose having a hose splice, wherein the first outside surface and the second inside surface are fused together and the anti-bonding agent prevents the inside surface of the first end from fixedly fusing together.

In another preferred embodiment method for splicing irrigation hose, a first hose having a first open end and an inside surface is provided. A non-toxic anti-bonding agent is applied to the inside surface of the first hose. A second hose having a second open end is provided. The first end of the first hose is inserted into the second open end of the second hose thereby creating an overlapping portion where the first hose and the second hose overlap. Then, a structural integrity material is applied about said overlapping portion prior to applying heat and pressure. Heat and pressure are then applied to the overlapping portion thereby bonding the first hose and the second hose together, wherein the anti-bonding agent prevents the inside surface of the first open end from fixedly fusing together.

In another preferred embodiment method for splicing irrigation hose, a first hose having a first open end and an inside surface is provided, and a non-toxic anti-bonding agent containing Vermiculite is applied to the inside surface of the first hose. A second hose having a second open end is provided and the first end of the first hose is inserted into the second open end of the second hose thereby creating an overlapping portion where the first hose and the second hose overlap. A structural integrity material is applied about the overlapping portion prior to applying heat and pressure. Finally, heat and pressure are applied to the structural integrity material thereby bonding the first hose and the second hose together, wherein the anti-bonding agent prevents the inside surface of the first open end from fixedly fusing together.

In another preferred embodiment method for splicing hose, a non-toxic anti-bonding agent containing Vermiculite is applied to an inside surface of a first end of a first hose. Then, the first end of the first hose is inserted into a second end of a second hose thereby creating an overlapping portion where the first hose is inserted into the second hose. Heat and pressure are applied to the overlapping portion thereby bonding the first hose and the second hose together to form a spliced hose, wherein the anti-bonding agent prevents the inside surface of the first end from fixedly fusing together.

DETAILED DESCRIPTION OF THE PREFERRED EMBODIMENT

Figure 1:
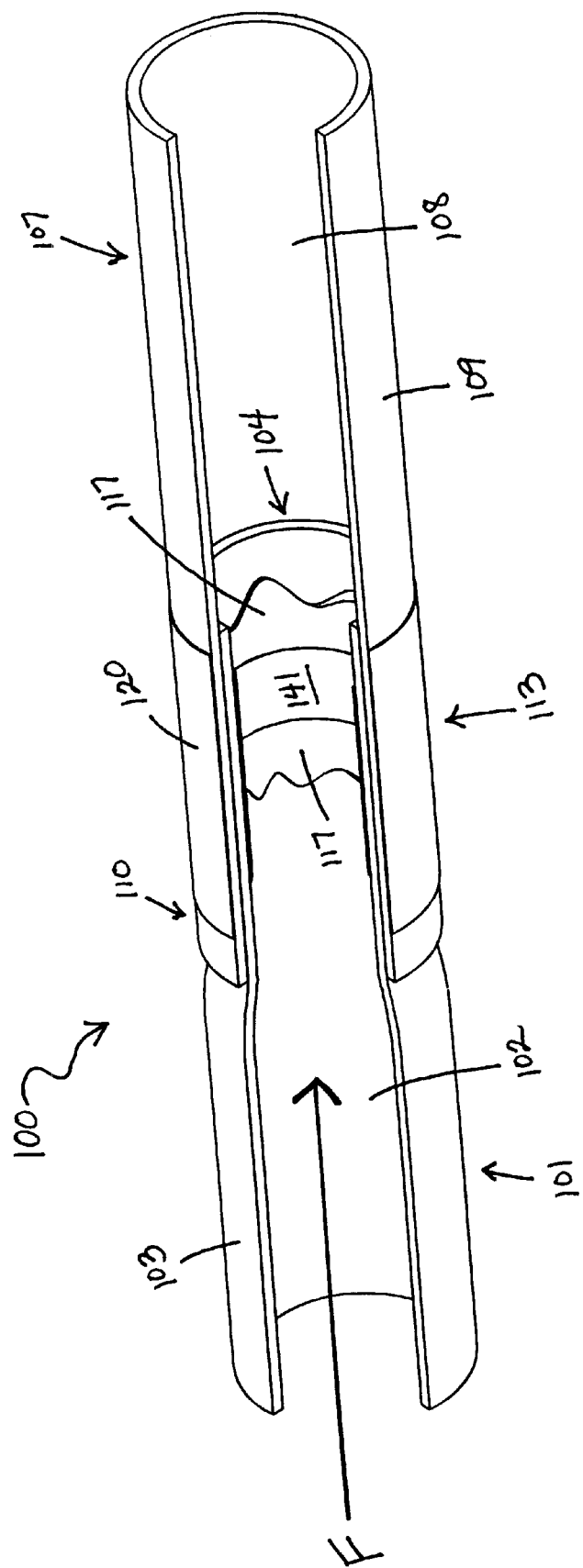
FIG. 1 shows a spliced hose with a portion removed longitudinally thereby also showing the inside of the spliced hose constructed according to the principles of the present invention.

The present method for splicing hose may easily be performed in the field to repair irrigation hose because only a portable heat sealer and a non-toxic anti-bonding agent 117 are needed to carry out the method. The method allows irrigation hose to be repaired, and the repaired irrigation hose can then be retrieved and re-installed in the same manner as new or undamaged hose, which reduces the amount of irrigation hose discarded with each new crop. The hoses spliced together using the present method can be flexible such as a flexible polymer hose or a flexible co-polymer hose with a wall thickness ranging from 0.004 inches to 0.112 inches. Also, the flexible polymer hose can be mono-chambered or multi-chambered. Examples of hoses that may be used include Dura-TraXX of all millimeter thickness, Mine-TraXX of all millimeter thickness, 1 3/8 Aqua-TraXX of all millimeter thickness, tape hose having a relatively thin wall thickness, thin wall hose with inline emitters, and thin wall hose with no emitters. This list is not exhaustive.

To splice two hoses together using the present method, a first hose 101 having a first end 104 and a second hose 107 having a second end 110 are obtained. To help ensure that a good splice results, it is best to clean the ends 104 and 110 of the hoses 101 and 107, respectfully. The outside surface 103 of the first end 104 and the inside surface 108 of the second end 110 should be cleaned of contaminates that will act as a barrier agent thereby preventing a strong weld. In the preferred embodiment, a cloth is used to clean the outside surface 103 of the first end 104 and a round brush is used to clean the inside surface 108 of the second end 110. Depending upon the size hose used, a 7/8 inch or a 5/8 inch brush may be used to clean the inside surface 108 of the second end 110.

After the ends 104 and 110 of the hoses 101 and 107 have been cleaned, a non-toxic anti-bonding agent 117, meaning any spreadable substance that does not solidify permanently into a fixed shape and prevents bonding of the hose material, is applied to the inside surface 102 of the first end 104 of the first hose segment 101. The anti-bonding agent 117 is also known as a parting agent. The present method uses the anti-bonding agent 117 as a heat barrier rather than a plastic film barrier or a flat heat shield when thermally bonding segments of the hoses to splice them together. Any suitable paste, liquid, grease, oil, admixture, emollient, suspension, cream, powder, or semi-solid substance may be used as long as it is not toxic because toxic compounds cannot be used in agriculture. Examples of other anti-bonding agents that may be used include synthetic multi-purpose grease with syncolon, Teflon food-grade antiseize, white powdered Mica, loctite lubricant, high vacuum silicon, high temperature grease, Teflon grease, gypsum, lime, baking soda, peanut butter, cream cheese, salt, and sugar. This list is not exhaustive as it is understood that other anti-bonding agents can also be used.

In the preferred embodiment, the anti-bonding agent 117 is made of water, latex, and chemically delaminated Vermiculite. The proportions are 2.4 parts Vermiculite paste, which contains water and 20% latex by weight of the Vermiculite, to one part Vermiculite powder, which also contains latex. In the paste form, the latex acts as a binder of the Vermiculite particles and helps bind the Vermiculite to the surface on which it is applied. Both the powder and the paste are sold and manufactured by W.R. Grace & Co. The paste is Micro Light Vermiculite Dispersion, part numbers HTS-XE, HTS-XE20, and HTS-SE. The powder is Micro Light Powder. Vermiculite is of the clay group similar to hydrous mica but has the layers of the molecules forming the Vermiculite held more weakly together by hydrated magnesium (six water molecules in octahedral coordination with Mg++) rather than tightly together by potassium ions, and it has a high cation exchange capacity. The prominent elements of Vermiculite are oxygen, silicon, aluminum, and magnesium. The properties of Vermiculite include a high relative swelling when wetted, but not as high as montmorillonite, and a moderate relative stickiness, and Vermiculite is typically found in a sub humid to humid soils high in micas. Vermiculite is an organic compound found in dirt, which is preferred for the anti-bonding agent because it will not contaminate the soil. It is not toxic, can withstand high temperatures, and is readily available. The powder form is actually finer than the compound actually found in the soil. When viewing Vermiculite under a microscope, the compound appears as little scales. When the anti-bonding agent is applied, heated, and dried, the compound shingles itself to lie relatively flat thereby becoming a solid sheet and forming a thin barrier. When water passes through the hose, the shingles of the anti-bonding agent break up and flow out of the spliced hose. The agent is sold commercially as Aqua-TraXX Thermal Splicer Parting Agent, part number ZCP9508-06, and the lid includes a brush for applying the agent. Approximately 1/16 teaspoon of agent per splice is recommended. The anti-bonding agent 117 should be applied to cover an area of the inside surface 102 of the first hose 101 that is at least co-extensive with the overlapping portion 113 of the two hose segment ends 104 and 110 to prevent the inside surface 102 from being welded together.

During the fusing process, the anti-bonding agent 117 prevents the inside surface 102 of the first hose segment 101 from becoming fixedly fused together. Although the inside surface 102 may become slightly bonded together during the fusing process, the water pressure from the irrigation system will cause the bond to peel apart thereby re-opening the waterway. Therefore, the anti-bonding agent 117 ensures that the peel strength is relatively weak. "Peel strength" describes the strength with which two components bonded together can be subsequently peeled apart. This is accomplished by coating the components with a substance that interferes with the heat fusing thereby reducing the bonding strength of the components so they may be subsequently easily peeled apart. The anti-bonding agent 117 used in the present invention may permit some bonding of the inside surface 102 of the first hose 101, however, when the irrigation system is turned on the water pressure causes the bond to peel apart thereby re-opening the waterway of the spliced hose 100. The anti-bonding agent 117 may remain in the spliced hose 100 without blocking the waterway or restricting the flow of water through the spliced hose 100. The actual peel strength of the spliced hose depends upon how the welder is used. For example, if a proper weld is achieved, the peel strength could be approximately 4 psi. However, if an improper weld is achieved, the peel strength could be approximately 16 psi. The present invention is not limited to these examples.

Then, the first end 104 of the first hose segment 101 is folded and inserted into the second end 110 of the second hose segment 107 so that the first hose segment end 104 is completely circumscribed by the second hose segment end 110. This creates an overlapping portion 113 of the two hose segment ends 104 and 110 preferably 1 ½ inches in length because a structural integrity material 120 used in the next step is preferably one inch in width. The first hose 101 inserted into the second hose 107 is preferably in the direction of the water flow to ensure a better weld, i.e. the water flows from the first hose 101 into the second hose 107. If the weld is not properly done, the flow and the pressure of the water will push against the inside surface 102 of the first hose 101 thus pushing the outside surface 103 of the first hose 101 against the inside surface 108 of the second hose 107 and result in a better seal. Also, if the hoses were reversed and the weld is not properly done, the water flow could catch on the end 104 of the first hose 101 and peel it away from the second hose 107 thereby rupturing the weld. The end 104 of the first hose 101 could also restrict the water flow through the hoses, but the closer the weld is to the end 104 of the first hose 101 the less this would affect the water flow.

Then, in the preferred embodiment, a structural integrity material 120 such as support tape is applied to the outside surface 109 of the second hose 107 proximate the overlapping portion 113 of the two hose segment ends 104 and 110 where the weld will be applied. Preferably, the structural integrity material 120 is one inch wide and is placed proximate the end 104 of the first hose 101. By placing the support tape 120 more proximate the end 104 of the first hose 101 than the end 110 of the second hose 107, a better weld is achieved, especially when the first hose 101 is placed inside the second hose 107 in the direction of the water flow. If tape hoses are being spliced together, the structural integrity material 120 should not be placed over the emitter portion of the hoses, which should be aligned, because this portion of the hoses is thicker and requires more heat and pressure to ensure a good weld. Wrapping a piece of support tape 120 around the outside surface 109 of the second hose 107 proximate the overlapping portion 113 prior to heat-seaming the two hose segment ends 104 and 110 together makes a better splice because the support tape 120 keeps the two segment ends 104 and 110 together when the heat is applied. The segment ends 104 and 110 where the heat, is applied are molten and the support tape 120 helps keep them from being squeezed apart by the spring forces applied by the weld head 130. In other words, the support tape 120 helps the hose keep its shape during the welding process. Also, the support tape 120 helps keep the circumference of the hoses intact during the welding process so the spliced hose 100 is not distorted. In addition, the structural integrity material 120 prevents the outside surface 109 of the second end 110 from adhering to the weld head 130 heating elements 140. In the preferred embodiment, a masking tape made by Can-Do National Tape, Aqua-TraXX Support Tape, part number ZCP9565-04, is used. Other types of structural integrity materials that may be used include Ape Tape masking tape, Teflon tape, paper tape, high temperature masking tape, and Kapton tape. This list is not exhaustive.

Figure 2:
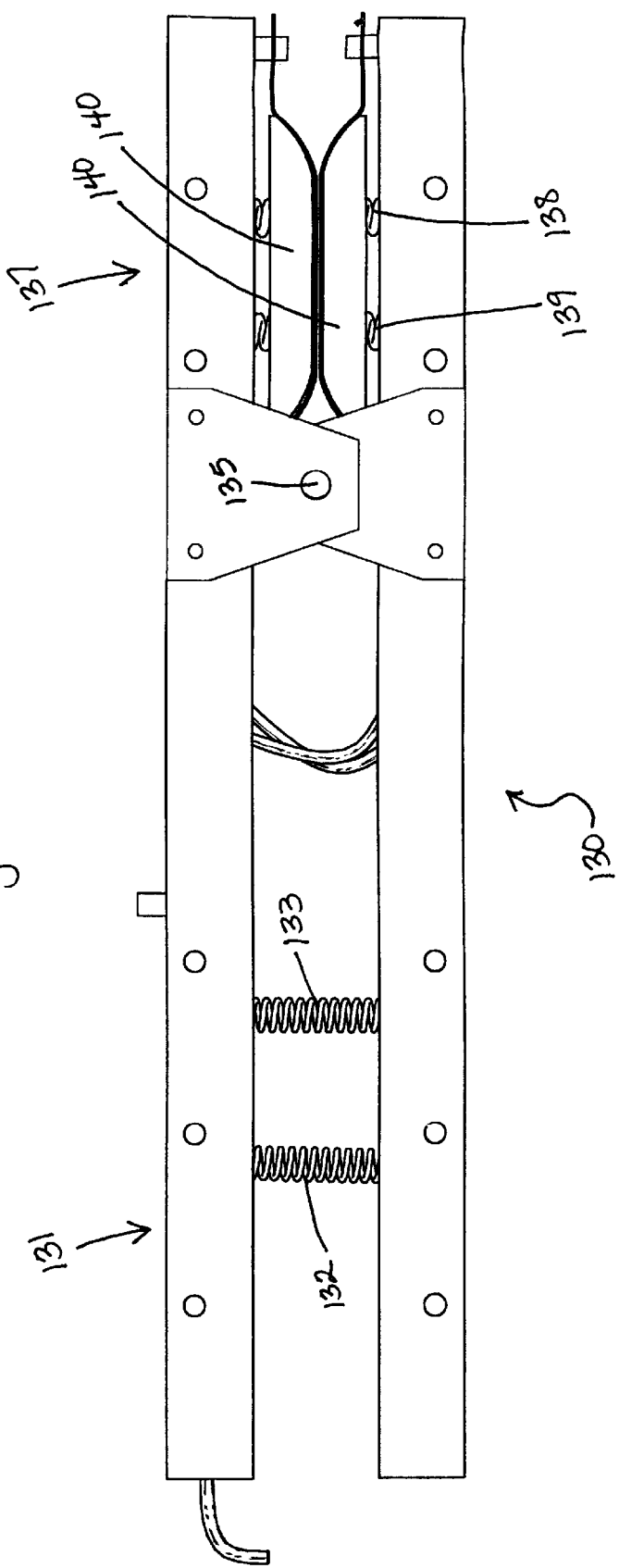
FIG. 2 shows a weld head used to create the spliced hose shown in FIG. 1.

Once the structural integrity material 120 is applied to the overlapping portion 113 of the hoses 101 and 107, the overlapping portion 113 is inserted into the weld head 130, and the heating elements 140 of the weld head 130 are placed over the structural integrity material 120. The preferred embodiment weld head 130 is shown in FIG. 2. The portable heat sealer is used to apply heat and pressure externally to the overlapping portion 113 at the structural integrity material thereby bonding the first hose segment end 104 and the second hose segment end 110 together and creating the irrigation hose splice 100. After the hoses have been spliced, the structural integrity material may be removed. The purpose of using the structural integrity material is to keep the molten plastic in place so it does not deform during the welding process. The structural integrity material does not become part of the weld. As the heat and pressure are applied, the anti-bonding agent 117 is partially displaced inside the hoses 101 and 107 to either side of the heating elements 140, and a thinner layer of anti-bonding agent remains at the weld location 141. The weld location 141 is shown in FIG. 1 and represents the width of the heating elements 140. The portable heat sealer used in the preferred embodiment is a portable unit designed to be used in the field and consists of a power supply unit and a weld head 130. An example of a suitable power supply unit is a 12-volt automotive battery. An example of a suitable weld head 130 is an Aqua-TraXX Weld Head, part number ZCP9573-05, which is connected by a power cable to an electronic controller that supplies power to the heating elements. The electronic controller controls the time and the temperature of the heating elements. In the preferred embodiment, an Aqua-TraXX Thermal Splicer, part number ZCP9573-03, is used, and it is a kit including carrying case, a weld head 130, an electronic controller, a power cord, a can of anti-bonding agent 117, and a roll of structural integrity material 120.

Generally, the heat and the pressure are applied simultaneously and then the heat is removed while the pressure is maintained during the cooling down time, which is approximately 19 seconds. The heating times are shown in Tables 1 and 2 below. The temperature of the heat applied is approximately 450° F. and the pressure applied is shown in Table 3 below. This is discussed further below.

FIG. 1 shows the spliced hose 100 with a portion removed longitudinally thereby exposing the anti-bonding agent 117 within the overlapping portion 113 of the spliced hose 100. As shown, the first hose 101 was placed within the second hose 107 in the direction of the water flow indicated by the arrow labeled F. The support tape 120 held the hoses 101 and 107 intact during the fusing process.

The electronic controller used in the preferred embodiment is also portable to be used in the field with the weld head 130. The power cable of the weld head 130 is connected to the weld head plug of the electronic controller to supply power to the heating elements 140 of the weld head 130. The power cable supply is connected to the battery plug of the electronic controller. Then, the red clamp of the power supply cable is connected to the positive terminal of the battery first and then the black clamp of the power supply cable is connected to the negative terminal of the battery. The electronic controller is then ready to use.

The toggle switch labeled power turns the power to the electronic controller on and off. The volume control is preset for the tone that signals the stage at which the weld head 130 is in the welding phase. An orange LED indicates when the weld head 130 has cooled down enough after it has gone through a welding cycle that will allow the operator to remove the hose without damaging the weld. A red LED indicates when heat is being applied to the heating elements 140 to weld the hoses together. A green LED indicates when the weld head 130 is ready to weld. Another orange LED indicates when the battery that is connected to the electronic controller does not have enough power to produce a good weld. Another toggle switch is used to increase the length of the welding cycle, and the cycle may be either long or short. The selector switch allows the operator to select the length of the welding cycle. This works in combination with the long/short toggle switch. For example, if the toggle switch is set at short and the selector switch is set at 1, then the welding cycle will be the shortest cycle that can be obtained of all the settings. If the toggle switch is set at short and the selector switch is set at 2, the welding cycle is increased by a few tenths of a second.

Table 1 indicates the heating times for the short and long time settings of the Aqua-TraXX Thermal Splicer electronic controller. These values are calculated averages that are applied to the heating elements 140 for a specific setting on the heating settings. The values are the total wattage used for the specific setting per heating elements 140. The cooling down time will vary depending upon the wall thickness of the hose used.

TABLE 1

Heating Times for the Short and Long Time Settings of the Aqua-TraXX Thermal Splicer Electronic Controller

| Rotary Switch Position | Heating Time in "Short" Position (Watt Seconds) | Heating Time in "Short" Position (Seconds) | Heating Time in "Long" Position (Watt Seconds) | Heating Time in "Long" Position (Seconds) |
| --- | --- | --- | --- | --- |
| 1 | 657.36 | 3.96 | 1445.86 | 8.71 |
| 2 | 723.76 | 4.36 | 1590.28 | 9.58 |
| 3 | 788.50 | 4.75 | 1743.00 | 10.50 |
| 4 | 854.90 | 5.15 | 1875.80 | 11.30 |
| 5 | 919.64 | 5.54 | 2025.20 | 12.20 |
| 6 | 986.04 | 5.94 | 2174.60 | 13.10 |
| 7 | 1052.44 | 6.34 | 2307.40 | 13.90 |
| 8 | 1117.18 | 6.73 | 2456.80 | 14.80 |
| 9 | 1183.58 | 7.13 | 2606.20 | 15.70 |
| 10 | 1248.32 | 7.52 | 2755.60 | 16.60 |
| 11 | 1314.72 | 7.92 | 2888.40 | 17.40 |
| 12 | 1381.12 | 8.32 | 3037.80 | 18.30 |

Table 2 indicates the heating time for new material, which is new Aqua-TraXX hose, and old material, which is. Aqua-TraXX Tape hose that has been used. The old Aqua-TraXX tape generally requires approximately 20 to 35% more weld time than new material. Splicing a new piece of material with an old piece of material will use the "New material" weld times. The anti-bonding agent used is the Aqua-TraXX Thermal Splicer Parting Agent discussed above. The 4 mil and to some degree the 6 mil Aqua-TraXX Tape hose is difficult to weld without fusing the center of the hose shut. It is highly recommended that the user preheat the weld head 130 by placing a discarded piece of hose between the weld head jaws and run a couple of heating cycles. The user should then set the welder for the approximate midpoint between the Cold Weld Head Setting ("CWH") and Hot Weld Head Setting ("HWH") of Table 2 and weld the piece of Aqua-TraXX hose to test. The timer of the welder may be placed in a short position ("S") or a long position ("L"). The hose is welded completely shut at the end rather than being spliced. When sealing the end of the hose, it is important to have a secure weld without cutting the hose, which will happen if the weld is too hot. The general settings of the timer to effectively seal the ends of the irrigation hose are as follows: ⅝ inch 4 mil to ⅝ inch 10 mil hose should be set at Short 7⅝ inch 12 mil to ⅝ inch 15 mil hose should be set at Short 11, and ⅞ inch 8 to 15 mil hose should be set at Long 1.

TABLE 2

Heating Time for New Material and Old Material

| Amount of Anti-Bonding Agent (Teaspoon) | New Material | Timer Position | Old Material | Timer Position |
|---|---|---|---|---|
| 1/4  | 4 mil × 5/8 CWH  | L 2  | 4 mil × 5/8 CWH  | L 5  |
| 1/4  | 4 mil × 5/8 HWH  | S 9  | 4 mil × 5/8 HWH  | L 1  |
| 1/4  | 6 mil × 5/8 CWH  | L 4  | 6 mil × 5/8 CWH  | L 7  |
| 1/4  | 6 mil × 5/8 HWH  | S 11 | 6 mil × 5/8 HWH  | L 2  |
| 1/8  | 8 mil × 5/8 CWH  | L 5  | 8 mil × 5/8 CWH  | L 9  |
| 1/8  | 8 mil × 5/8 HWH  | S 12 | 8 mil × 5/8 HWH  | L 3  |
| 1/16 | 10 mil × 5/8 CWH | L 1  | 10 mil × 5/8 CWH | L 9  |
| 1/16 | 10 mil × 5/8 HWH | L 10 | 10 mil × 5/8 HWH | L 4  |
| 1/16 | 12 × 5/8 CWH     | L 7  | 12 × 5/8 CWH     | L 12 |
| 1/16 | 12 × 5/8 HWH     | L 10 | 12 × 5/8 HWH     | L 11 |
| 1/16 | 15 × 5/8 CWH     | L 7  | 15 × 5/8 CWH     | L 12 |
| 1/16 | 15 × 5/8 HWH     | L 8  | 15 × 5/8 HWH     | L 11 |
| 1/8  | 8 × 7/8 CWH      | L 4  | 8 × 7/8 CWH      | L 12 |
| 1/8  | 8 × 7/8 HWH      | L 8  | 8 × 7/8 HWH      | L 7  |
| 1/16 | 10 × 7/8 CWH     | L 4  | 10 × 7/8 CWH     | L 12 |
| 1/16 | 10 × 7/8 HWH     | L 4  | 10 × 7/8 HWH     | L 7  |
| 1/16 | 12 × 7/8 CWH     | L 9  | 12 × 7/8 CWH     | L 12 |
| 1/16 | 12 × 7/8 HWH     | L 7  | 12 × 7/8 HWH     | L 11 |
| 1/16 | 15 × 7/8 CWH     | L 10 | 15 × 7/8 CWH     | L 12 |
| 1/16 | 15 × 7/8 HWH     | L 9  | 15 × 7/8 HWH     | L 12 |

Table 3 indicates results of tests ran on the clamping forces generated by the weld head 130 while welding the hoses 101 and 107 at the support tape 120. The hoses used were the Aqua-TraXX Tape hoses, and the sizes of the hoses are indicated in the table. The percent deviation (imbalance in applied versus reacted torque) for 6 millimeters by ⅝, 10 millimeters by ⅝, 15 millimeters by ⅝, and 15 millimeters by ⅞ were approximately +/−10%. The remaining test data was within +/−5%. FIG. 2 shows the components of the weld head 130 indicated in Table 3. The handle 131 and the welding end 137 pivot at the pivot point 135. The handle 131 includes an outboard handle spring 132 and in inboard handle spring 133, and the welding end 137 includes an outboard hard fiber spring 138, an inboard hard fiber spring 139, and heating elements 140. When the handle 131 is compressed, the welding end 137 opens and the hoses at the support tape 120 may be placed in the heating elements 140. When the handle 131 is released, the clamping forces generated by the weld head 130 are shown in Table 3 below.

TABLE 3

Clamping Forces Generated by the Weld Head While Welding the Hoses at the Support Tape

| Hose Size | Outboard Handle Spring Force (Pounds) | Inboard Handle Spring Force (Pounds) | Outboard Hard Fiber Spring Force (Pounds) | Inboard Hard Fiber Spring Force (Pounds) |
|---|---|---|---|---|
| Jaws Closed and Empty | 10.72 | 11.35 | 23.54 | 35.31 |
| 4 mil × 5/8  | 12.30 | 12.60 | 38.84 | 32.96 |
| 6 mil × 5/8  | 12.66 | 12.98 | 31.78 | 30.60 |
| 8 mil × 5/8  | 12.93 | 13.12 | 40.02 | 35.31 |
| 10 mil × 5/8 | 13.12 | 13.25 | 42.37 | 40.02 |
| 12 mil × 5/8 | 13.57 | 13.65 | 42.37 | 35.31 |
| 15 mil × 5/8 | 14.47 | 14.66 | 49.43 | 41.20 |
| 10 mil × 7/8 | 13.63 | 13.67 | 40.02 | 34.13 |
| 12 mil × 7/8 | 13.88 | 13.84 | 48.26 | 34.13 |
| 15 mil × 7/8 | 14.35 | 14.26 | 44.73 | 30.60 |

The hose splice is then allowed to cool and is ready for use.

The present invention does not utilize a solid object as a heat shield but rather utilizes a non-toxic anti-bonding agent 117 that can be washed away from the inside of the spliced hose 100. Therefore, the anti-bonding agent 117 does not significantly obstruct the flow of water within the hose 100 as a solid object would do regardless of the direction of the water flow. In addition, the anti-bonding agent is less expensive and easier to apply and use than previous methods used to splice hose together.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for splicing hose, comprising:
   a. applying a non-toxic anti-bonding agent to an inside surface of a first end of a first hose;
   b. inserting said first end of said first hose into a second end of a second hose thereby creating an overlapping portion where said first hose is inserted into said second hose; and
   c. applying heat and pressure to said overlapping portion thereby bonding said first hose and said second hose together to form a spliced hose, wherein said anti-bonding agent prevents said inside surface of said first end from fixedly fusing together.

2. The method of claim 1, further comprising removing the heat from said overlapping portion while maintaining the pressure.

3. The method of claim 1, further comprising applying a structural integrity material about said overlapping portion prior to applying heat and pressure.

4. A method for splicing hose, comprising:
   a. applying a non-toxic anti-bonding agent to an inside surface of a first end of a first hose;
   b. inserting said first end of said first hose into a second end of a second hose thereby creating an overlapping portion where said first hose is inserted into said second hose;

c. applying heat and pressure to said overlapping portion thereby bonding said first hose and said second hose together to form a spliced hose, wherein said anti-bonding agent prevents said inside surface of said first end from fixedly fusing together; and d. allowing water to flow through said spliced hose to peel apart said inside surface thereby opening said spliced hose.

5. The method of claim 4, further comprising removing the heat from said overlapping portion while maintaining the pressure.

6. The method of claim 4, further comprising applying a structural integrity material about said overlapping portion prior to applying heat and pressure.

7. A method for splicing hose, comprising:

a. applying a non-toxic anti-bonding agent to an inside surface of a first end of a first hose;

b. inserting said first end of said first hose into a second end of a second hose thereby creating an overlapping portion where said first hose and said second hose overlap; and c. bonding said first hose and said second hose together, wherein said anti-bonding agent prevents said inside surface of said first end from fixedly fusing together.

8. The method of claim 7, wherein the step of bonding said first hose and said second hose-together comprises applying heat and pressure externally to said overlapping portion.

9. The method of claim 8, further comprising removing the heat from said overlapping portion while maintaining the pressure.

10. The method of claim 8, wherein the application of heat and pressure is automated.

11. The method of claim 7, wherein said first hose and said second hose are multi-chambered flexible polymer hose.

12. The method of claim 8, further comprising applying a structural integrity material about said overlapping portion prior to applying heat and pressure.

13. A method for repairing a hose, comprising:

a. providing a first hose having a first open end, a first inside surface, and a first outside surface;

b. applying a non-toxic anti-bonding agent to said inside surface of said first hose;

c. providing a second hose having a second open end and a second inside surface;

d. inserting said first end of said first hose into said second end of said second hose thereby creating an overlapping portion, wherein said first outside surface contacts said second inside surface; and e. bonding said first hose and said second hose together proximate said overlapping portion to create a single repaired hose having a hose splice, wherein said first outside surface and said second inside surface are fused together, and wherein said anti-bonding agent prevents said inside surface of said first end from fixedly fusing together.

14. The method of claim 13, wherein the step of bonding said first hose and said second hose together comprises applying heat and pressure externally to said overlapping portion.

15. The method of claim 14, further comprising applying a structural integrity material about said overlapping portion prior to applying heat and pressure.

16. A method for splicing irrigation hose, comprising:

a. providing a first hose having a first open end and an inside surface;

b. applying a non-toxic anti-bonding agent to said inside surface of said first hose;

c. providing a second hose having a second open end;

d. inserting said first end of said first hose into said second open end of said second hose thereby creating an overlapping portion where said first hose and said second hose overlap;

e. applying a structural integrity material about said overlapping portion prior to applying heat and pressure; and f. applying heat and pressure to said structural integrity material thereby bonding said first hose and said second hose together, wherein said anti-bonding agent prevents said inside surface of said first open end from fixedly fusing together.

17. The method of claim 16, further comprising removing the heat from said overlapping portion while maintaining, the pressure.

18. A method for splicing irrigation hose, comprising:

a. providing a first hose having a first open end and an inside surface;

b. applying a non-toxic anti-bonding agent containing Vermiculite to said inside surface of said first hose;

c. providing a second hose having a second open end;

d. inserting said first end of said first hose into said second open end of said second hose thereby creating an overlapping portion where said first hose and said second hose overlap;

e. applying a structural integrity material about said overlapping portion prior to applying heat and pressure; and f. applying heat and pressure to said structural integrity material thereby bonding said first hose and said second hose together, wherein said anti-bonding agent prevents said inside surface of said first open end from fixedly fusing together.

19. A method for splicing hose, comprising:

a. applying a non-toxic anti-bonding agent containing Vermiculite to an inside surface of a first end of a first hose;

b. inserting said first end of said first hose into a second end of a second hose thereby creating an overlapping portion where said first hose is inserted into said second hose; and c. applying heat and pressure to said overlapping portion thereby bonding said first hose and said second hose together to form a spliced hose, wherein said anti-bonding agent prevents said inside surface of said first end from fixedly fusing together.

* * * * *

UNITED STATES PATENT AND TRADEMARK OFFICE
CERTIFICATE OF CORRECTION

PATENT NO.    : 6,540,859 B1
DATED         : April 1, 2003
INVENTOR(S)   : Alfred Alvidrez It is certified that error appears in the above-identified patent and that said Letters Patent is hereby corrected as shown below:

<u>Title page,</u>
Item [57], ABSTRACT,
Line 4, delete "104" and insert therefore -- 101 --
Line 5, delete "101" and insert therefore -- 110 --

<u>Column 1,</u>
Line 22, delete "drip-tapes" and insert therefore -- drip tapes --

<u>Column 6,</u>
Line 20, delete ","

<u>Column 8,</u>
Line 43, delete "material" and insert therefore -- Material --
Line 65, delete "7⅝" and insert therefore -- 7, ⅝ --

<u>Column 11,</u>
Line 26, delete "hose-together" and insert therefore -- hose together --

Signed and Sealed this

First Day of July, 2003

JAMES E. ROGAN
*Director of the United States Patent and Trademark Office*